(12) United States Patent
Ripoll

(10) Patent No.: US 12,111,147 B2
(45) Date of Patent: Oct. 8, 2024

(54) DESIGNING AND CONSTRUCTING DOT PROJECTORS FOR THREE-DIMENSIONAL SENSOR MODULES

(71) Applicant: ams Sensors Singapore Pte. Ltd, Singapore (SG)

(72) Inventor: Olivier Ripoll, Bern (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 204 days.

(21) Appl. No.: 17/639,734

(22) PCT Filed: Sep. 3, 2020

(86) PCT No.: PCT/SG2020/050511
§ 371 (c)(1),
(2) Date: Mar. 2, 2022

(87) PCT Pub. No.: WO2021/045685
PCT Pub. Date: Mar. 11, 2021

(65) Prior Publication Data
US 2022/0290976 A1 Sep. 15, 2022

Related U.S. Application Data

(60) Provisional application No. 62/895,581, filed on Sep. 4, 2019.

(51) Int. Cl.
*G01B 11/25* (2006.01)
*G02B 27/42* (2006.01)
*G06V 10/98* (2022.01)

(52) U.S. Cl.
CPC ........ *G01B 11/2513* (2013.01); *G01B 11/254* (2013.01); *G02B 27/425* (2013.01); *G06V 10/993* (2022.01)

(58) Field of Classification Search
CPC .............. G01B 11/2513; G01B 11/254; G02B 27/425; G02B 27/0012; G06V 10/993;
(Continued)

(56) References Cited

U.S. PATENT DOCUMENTS 10,928,642 B2 * 2/2021 Bakin ................ G02B 27/0905
11,828,954 B2 * 11/2023 Huang ..................... G01C 3/08
(Continued)

FOREIGN PATENT DOCUMENTS

CN 102077143 A 5/2011
CN 105592310 A 5/2016
(Continued)

OTHER PUBLICATIONS

PCT International Search Report & Opinion of counterpart PCT/SG2020/050511, dated Dec. 1, 2020, 14 pgs.
(Continued)

*Primary Examiner* — Isiaka O Akanbi
(74) *Attorney, Agent, or Firm* — VIERING, JENTSCHURA & PARTNER MBB

(57) ABSTRACT

For an optical dot projector having multiple light emitters, a relationship is determined between locations of the light emitters with respect to a substrate of the optical dot projector and corresponding first locations of dots projected by the dot projector onto an imaging plane. An optical grating approximating one or more optical characteristics of one or more optical elements of the optical dot projector is determined based on the relationship. Second locations of dots corresponding to a replacement of the one or more optical elements of the optical dot projector by the optical grating are determined, and modified locations of the light emitters with respect to the substrate are determined based on the second locations of dots. Optical dot projectors are constructed according to the determined modified locations.

10 Claims, 8 Drawing Sheets

(58) Field of Classification Search
CPC ............ G03B 21/2013; G03B 21/2033; G03B 21/2046; H04N 23/56
USPC .................. 356/603, 604, 614, 610, 616
See application file for complete search history.

(56) References Cited

U.S. PATENT DOCUMENTS

| | | |
|---|---|---|
| 2009/0323040 A1 | 12/2009 | Cornell et al. |
| 2011/0096182 A1 | 4/2011 | Cohen et al. |
| 2013/0044187 A1* | 2/2013 | Hammes .............. H04N 13/239 |
| | | 348/46 |
| 2014/0333906 A1 | 11/2014 | Hirono et al. |
| 2015/0097947 A1* | 4/2015 | Hudman ............... G01S 7/4863 |
| | | 348/136 |
| 2016/0134851 A1 | 5/2016 | Grundhofer et al. |
| 2016/0178915 A1* | 6/2016 | Mor ....................... G02B 27/20 |
| | | 359/566 |
| 2016/0197452 A1* | 7/2016 | Mor ....................... H01S 5/423 |
| | | 359/569 |
| 2017/0039756 A1 | 2/2017 | Moule et al. |
| 2017/0186146 A1 | 6/2017 | Raniwala et al. |
| 2017/0374244 A1* | 12/2017 | Swaminathan ......... H01S 5/426 |
| 2018/0033146 A1* | 2/2018 | Bleyer ............... G01B 11/2513 |
| 2018/0131450 A1* | 5/2018 | Kare ....................... G01S 17/88 |
| 2018/0225866 A1* | 8/2018 | Zhang ..................... G06T 7/593 |
| 2019/0249984 A1* | 8/2019 | Barlev ..................... G06T 7/55 |
| 2020/0225501 A1* | 7/2020 | Bakin ................ G01B 11/2513 |
| 2020/0278562 A1* | 9/2020 | Huang ................. H04N 13/254 |
| 2020/0387004 A1* | 12/2020 | Xu ....................... G02B 27/425 |

FOREIGN PATENT DOCUMENTS

| | | | |
|---|---|---|---|
| CN | 106454291 A | 2/2017 | |
| CN | 208 351 151 U | 1/2019 | |
| JP | 2011000357 A | 1/2011 | |
| TW | 201314343 A | 4/2013 | |
| WO | 2018201585 A1 | 11/2018 | |
| WO | WO-2019086004 A1 * | 5/2019 | ............... G01C 3/08 |

OTHER PUBLICATIONS

Machine Translation of WO 2018/201585, downloaded on Nov. 24, 2020 (12 pages).
Machine Translation of CN 208351151 U, downloaded on Nov. 24, 2020 (10 pages).
Miao, Yinxiao et al. "Design of diffractive optical element projector for a pseudorandom dot array by an improved encoding method", 2019, pp. G169-G176, Applied Optics, No. 58, vol. 34.
First Search Report issued for the parallel Chinese patent application No. 202080062377.3, dated Oct. 27, 2023, 3 pages (for informational purposes only).
Search Report by Registered Search Organization issued for the parallel Japanese patent application No. 2022514752, dated Mar. 15, 2023, 12 pages (for informational purposes only).
Wang, Hui et al., "Spatially Weighted Virtual Viewpoint Mapping Algorithms", Computer Engineering and Applications 2016, 20 pages (including 12 pages English machine translation), No. 52, issue 8.

* cited by examiner

DESIGNING AND CONSTRUCTING DOT PROJECTORS FOR THREE-DIMENSIONAL SENSOR MODULES

TECHNICAL FIELD

The disclosure relates to designing and constructing dot projectors for use in three-dimensional sensor modules.

BACKGROUND

Three-dimensional sensor modules are used to measure the physical characteristics and/or the movement of a subject in three-dimensions. As an example, a three-dimensional sensor module can be used to measure the contours of a person's face (e.g., to conduct biometric authentication via facial recognition). As another example, a three-dimensional sensor module can be used to measure the movement of an object (e.g., to record dynamic events in three-dimensions).

SUMMARY

The present disclosure describes techniques for designing and constructing dot projectors for use in three-dimensional sensor modules. As an example, an initial "sample" three-dimensional sensor module is constructed for testing or calibration purposes. The sample three-dimensional sensor module includes a dot projector with a light source having a particular arrangement of light emitters on a substrate. The dot projector is operated such that it emits a pattern of light onto a test imaging surface, and the characteristics of the projected pattern of light is measured. Based on these measurements, the locations of one or more of the light emitters is modified to account for misalignments, gaps, and/or localized variations in dot density in the projected pattern of light. In turn, one or more "production" three-dimensional sensor modules are constructed, each having the modified arrangement of light emitters.

These design and construction techniques can provide a variety of benefits. For example, in some implementations, the three-dimensional sensor modules produced using these techniques are operable to project a pattern of light that is more evenly distributed onto a subject (e.g., compared to a three-dimensional sensor module produced without these techniques). Thus, the three-dimensional sensor modules can detect and measure physical features and/or movements more consistently across its entire field of view. Further, the three-dimensional sensor modules can detect and measure physical features and/or movement according to a greater degree of detail, due to the reduction or elimination of gaps that might otherwise render a subject's features undetectable to the three-dimensional sensor module.

In an aspect, the present disclosure describes a method that includes determining, for an optical dot projector having a plurality of light emitters, a relationship between locations of the plurality of light emitters with respect to a substrate of the optical dot projector and corresponding first locations of dots projected by the dot projector onto an imaging plane. The method also includes determining, based on the relationship, an optical grating approximating one or more optical characteristics of one or more optical elements of the optical dot projector. The method further includes determining second locations of dots corresponding to a replacement of the one or more optical elements of the optical dot projector by the optical grating, and determining, based on the second locations of dots, modified locations of the plurality of light emitters with respect to the substrate to reduce a distortion in a spatial pattern of the dots projected by the dot projector. The method further includes constructing a plurality of optical dot projectors, each having a respective plurality of light emitters arranged according to the determined modified locations.

Implementations of this aspect can include one or more of the following features.

In some implementations, the relationship can include a transfer function indicating the first locations of dots projected by the dot projector onto the imaging plane as a function of the locations of the light emitters with respect to the substrate of the optical dot projector.

In some implementations, the light emitters can include multiple vertical cavity surface emitting laser (VSCEL) emitters arranged on the substrate.

In some implementations, the optical grating can be determined based on a curvature of the first locations of dots with respect to a horizontal dimension of the imaging plane.

In some implementations, the optical grating can be further determined based on a curvature of the first locations of dots with respect to a vertical dimension of the imaging plane.

In some implementations, the one or more optical elements can include one or more diffractive optical elements.

In some implementations, determining the optical grating approximating the optical characteristics of the one or more optical elements of the optical dot projector can include determining a first periodicity of the optical grating with respect to a first dimension.

In some implementations, determining the optical grating approximating the optical characteristics of the one or more optical elements of the optical dot projector can include determining a second periodicity of the optical grating with respect to a second dimension, the second dimension being orthogonal to the first dimension.

In some implementations, the method can further include constructing multiple optical sensor modules. Constructing the optical sensor modules can include, for each optical sensor module, packaging a respective optical dot projector and a respective image sensor in the optical sensor module.

In some implementations, determining the relationship can include projecting, using the optical dot project, the dots onto the imaging plane, measuring the locations of the light emitters with respect to the substrate of the optical dot projector, measuring the first locations of the dots with respect to the imaging plane, and determining the relationship based on the measured locations of the light emitters with respect to the substrate of the optical dot projector and the measured first locations of the dots with respect to the imaging plane.

The details of one or more implementations are set forth in the accompanying drawings and the description below. Other aspects, features and advantages will be apparent from the description and drawings, and from the claims.

DETAILED DESCRIPTION

Figure 1:
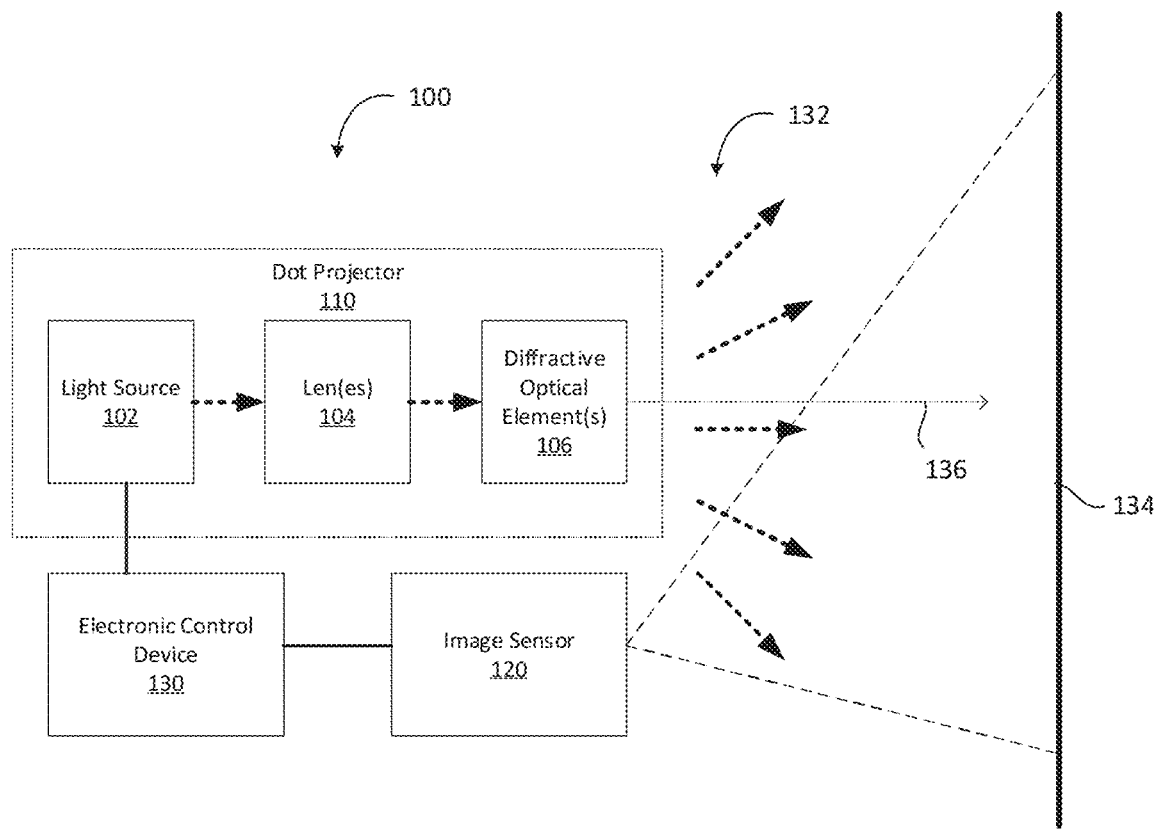
FIG. 1 is a schematic diagram of an example three-dimensional sensor module.

FIG. 1 is a schematic diagram of an example three-dimensional sensor module 100. The three-dimensional sensor module 100 is operable to measure the physical characteristics and/or the movement of a subject in three-dimensions. As an example, the three-dimensional sensor module 100 can be used to measure the contours of a person's face (e.g., to conduct biometric authentication via facial recognition). As another example, the three-dimensional sensor module 100 can be used to measure the movement of an object over time (e.g., to record dynamic events in three-dimensions).

In some implementations, the three-dimensional sensor module 100 can be implemented as a standalone device. In some implementations, the three-dimensional sensor module 100 can be integrated into another device. For example, electronic devices, such as smart phones, tablets, and other portable computing devices, can include one or more three-dimensional sensor modules 100 to record three-dimensional images, sense motion in three-dimensions, conduct facial recognition, and/or detect gestures in three-dimensions.

The three-dimensional sensor module 100 includes a dot projector 110, an image sensor 120, and an electronic control device 130. During an operation of the three-dimensional sensor module 100, the dot projector 110 projects a pattern of light 132 (e.g., a pattern of dots having a known arrangement) onto a subject 134 (e.g., an object, a person, etc.). The image sensor 120 (e.g., a photodetector, a charge-coupled device (CCD), a complementary metal-oxide semiconductor (CMOS) image sensor, etc.) measures the pattern of light 132 projected onto the subject 134, and transmits the measurements to the electronic control device 130 for interpretation. In some implementations, the image sensor 120 can capture one or more images indicating the locations of the projected dots at specific points in time.

The electronic control device determines the physical characteristics and/or the movement of a subject in three-dimensions based on the images. For example, the pattern of light 132 will appear differently in the images, depending on the physical characteristics of the subject upon which it is projected. For instance, depending on the location of certain physical features, the depth of those features, and/or the absence of physical features in a particular area, the pattern of light 132 will exhibit denser distributions of dots in certain areas (e.g., areas with physical features that are closer to the three-dimensional sensor module 100), less dense distributions of dots in other areas (e.g., areas with physical features that are further from the three-dimensional sensor module 100), and/or no dots at all in some areas (e.g., areas without any physical features). The electronic control device can generate data representing a surface of the subject (e.g., a surface map) based on these images. Further, the electronic control device can determine a movement of a subject based on the images (e.g., by determining a change in the surface maps over time).

The dot projector 110 includes a light source 102 operable to emit light, one or more lenses 104, and one or more diffractive optical elements 106 operable to project the emitted light according to a particular pattern.

Figure 2:
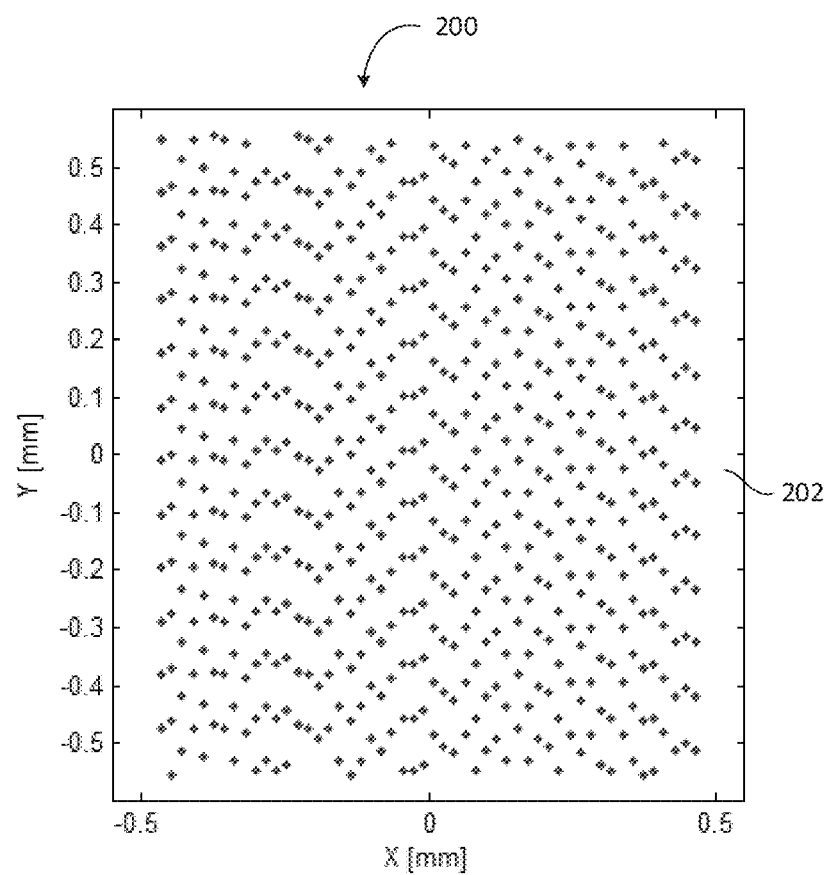
FIG. 2 is a diagram showing the locations of several example light emitters positioned on a planar substrate of a light source.

The light source 102 can include one or more lasers, such as vertical cavity surface emitting lasers (VCSELs) or intra-red (IR) lasers. In some implementations, the light source 102 can include one or more other devices that generate light, such as light emitting diodes (LEDs), infrared (IR) LEDs, and organic LEDs (OLEDs). In some implementations, the light source 102 can include one or more light emitters positioned on a plane (e.g., the surface of a substrate). As an example, FIG. 2, shows the locations of several representative light emitters 200 (e.g., VSCELs) positioned on a planar substrate 202 (e.g., a surface extending in the x- and y-directions with respect to a Cartesian coordinate system). Although representative light emitters are shown in FIG. 2, it is understood a light source can include any number of light emitters arranged according to any pattern.

The lenses 104 and the diffractive optical elements 106 are in optical communication with the light source 102, and receive at least some of the light emitted by the light source 102. The lenses 104 receive light emitted by the light source 102, and focuses the light onto or through the diffractive elements 106. As the light passes through the diffractive optical elements 106, the diffractive optical elements 106 cause the light to diffract in a particular manner, resulting in the emission of the pattern of light 132. For example, the diffractive optical elements 106 can cause the light to diffract such that light is more intense in certain spatial locations (e.g., due to constructive interference of the diffracted light at those locations), and less intense or even absent in certain spatial locations (e.g., due to destructive interference of the diffracted light at those locations).

Figure 3A:
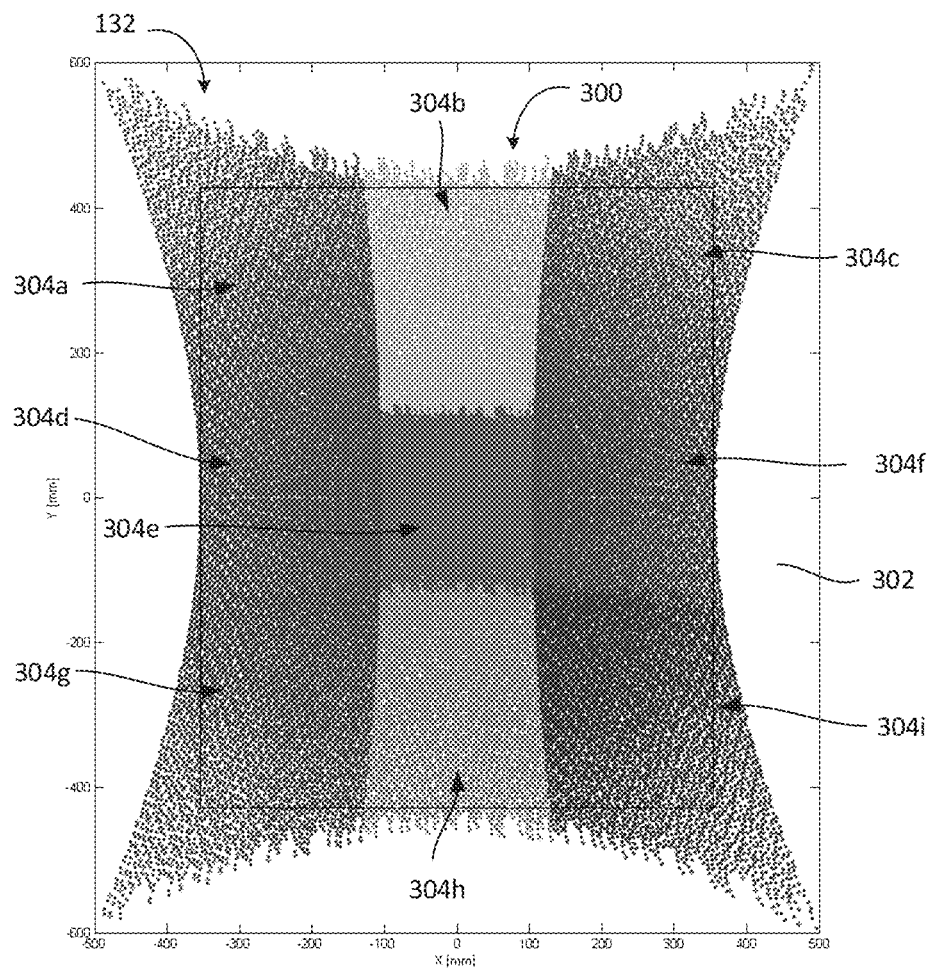
FIGS. 3A and 3B are diagrams of an example pattern of light projected onto an imaging plane.

In some implementations, the diffractive optical elements 106 can be configured such that the pattern of light 132 includes multiple dots (e.g., discrete localized spots of light) having a particular spatial arrangement. For instance, the pattern of light 132 can include multiple dots distributed evenly or otherwise across a particular imaging plane (e.g., to cover a particular portion of the imaging plane with a distribution of dots). As an example, FIG. 3A shows a pattern of light 132 projected onto an imaging plane 302 (e.g., a notional plane or a planar surface of an object orthogonal to the projection axis 136 of the dot projector 110). The pattern of light 132 includes a number of dots 300 distributed across a portion the imaging plane 302. In this example, the pattern of light 132 includes nine different "cells" 304a-304i (e.g., generally repeating patterns of dots) arranged in a three by three configuration. Each of the cells 304a-304i has a generally similar distribution of dots 300. However, due to the optical properties of the optical elements of the dot projector 110, the pattern of light 132 exhibits a "pin-cushion" effect. For instance, the boundaries of the cells 304a-304i exhibit varying degrees of curvature (e.g., according to a hyperbolic relationship) depending on their positions and/or angular relationship with respect to the center of the pattern of light 132. Further, due to this curvature, the distribution of dots 300 also varies depending on the dots' positions and/or angular relationships with respect to the center of the pattern of light 132. For instance, the dots 300 of the center cell 304e are generally more densely distributed than the dots of the corner cells 304a, 304c, 304g, and 304i.

Figure 3B:
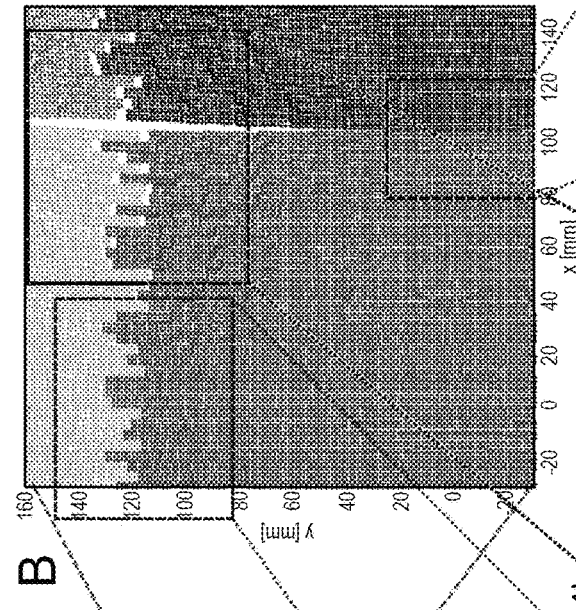
Figure 3B:
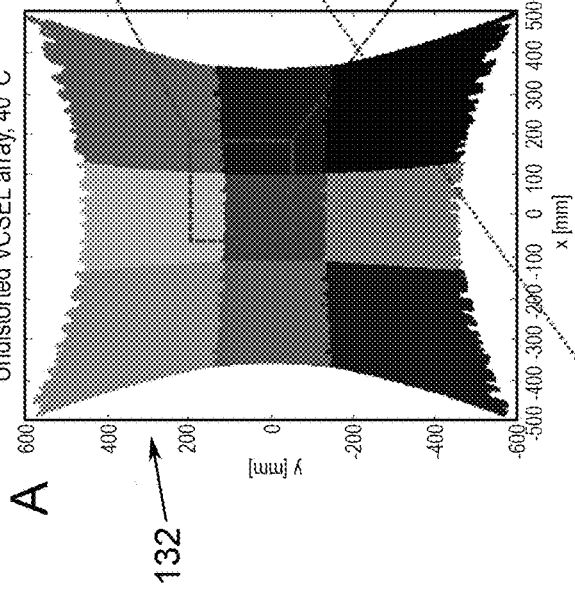
Figure 3B:
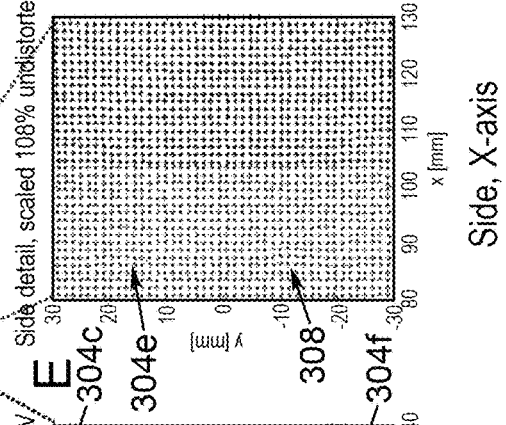
Figure 3B:
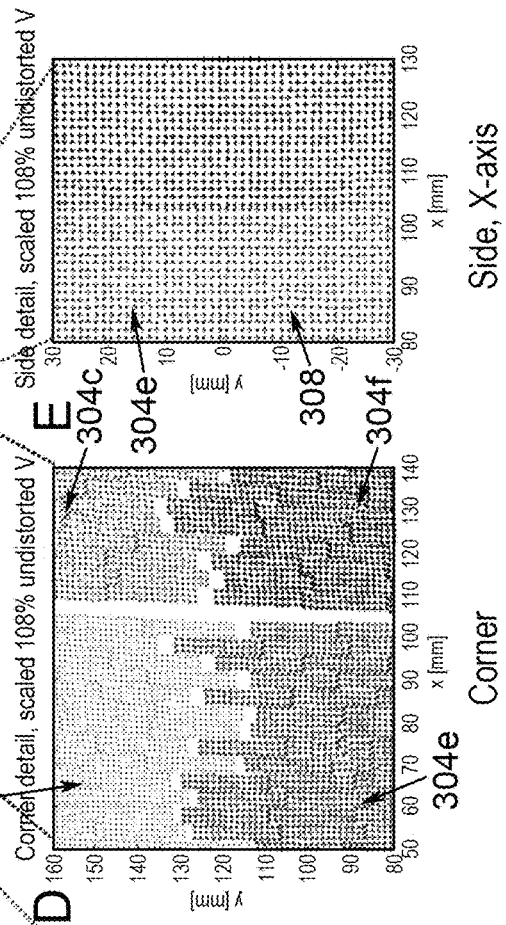
Figure 3B:
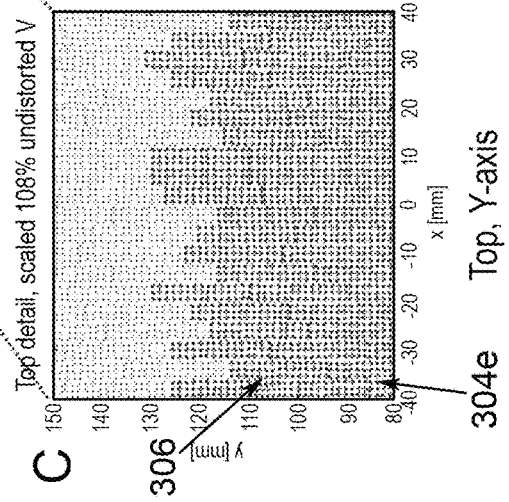

Further, due to the optical properties of the optical elements of the dot projector 110, the cells 304a-304i may exhibit misalignments or gaps relative to one another. For example, FIG. 3B shows a full field of view (FOV) of the pattern of light 132 (Panel A), a zoomed in portion of the pattern of light 132 (Panel B), and further zoomed in portions of the pattern of light 132 (Panels C, D, and E). As shown in FIG. 3B (particularly Panel D), the cells 304b, 304c, 304e, and 304f are misaligned with each other at their interface, resulting in gaps between them (e.g., no dots are projected within those gaps). In some implementations, this may be undesirable. For instance, due to the lack of projected dots in these gaps, the three-dimensional sensor module 100 may be unable to detect features of the subject and/or movement of the subject coinciding with those gaps.

Further still, due to the optical properties of the optical elements of the dot projector 110, the cells 304a-304i may exhibit localized variations in dot density. For example, as shown in Panel C, the cell 304e includes localized regions 306 having higher densities of dots relative to their surroundings (e.g., manifesting as dense lines or clumps of dots). As another example, as shown in Panel E, the cell 304e includes localized regions 308 having lower densities of dots relative to their surroundings (e.g., manifesting as a sparseness of dots). In some implementations, this may be undesirable. For instance, due to the variation in dot density, the three-dimensional sensor module 100 may exhibit variations in its sensitivity across its field of view.

The performance of the three-dimensional sensor module 100 can be enhanced by eliminating or otherwise lessening the presence of these misalignments, gaps, and/or localized variations in dot density in the projected pattern of light. In some implementations, the physical arrangement of the light emitters of the light source 102 (e.g., the positions of the light emitters 200 on the substrate 202) can be modified or "pre-distorted" such that the resulting pattern of light is more uniform.

As an example, an initial "sample" three-dimensional sensor module is constructed for testing or calibration purposes. The sample three-dimensional sensor module includes a dot projector with a light source having a particular arrangement of light emitters on a substrate. The dot projector is operated such that it emits a pattern of light onto a test imaging surface (e.g., a planar surface orthogonal to the projection axis of the light projector and positioned at a specified distance from the light projector). The characteristics of the projected pattern of light is measured. Based on these measurements, the locations of one or more of the light emitters is modified (e.g., shifted in the x and/or y direction with respect to the substrate of the dot light source) to account for the misalignments, gaps, and/or localized variations in dot density in the projected pattern of light. In turn, one or more "production" three-dimensional sensor modules are constructed, each having the modified arrangement of light emitters.

In particular, in an example implementation, a relationship is determined between (i) locations of the light emitters of a dot projector, and (ii) the resulting dots produced by the dot projector (e.g., a transfer function defining the relationship). Further, an "idealized" grating configuration is determined that approximates the behavior of the light projector. Further, a determination is made regarding the location of the dots had the optical elements of the projector preceding the diffractive optical elements 106 (e.g., the lenses 104) been replaced by the idealized grating. The transfer function is applied in reverse to these locations to determine the "pre-distorted" locations of the light emitters.

These design and construction techniques can provide a variety of benefits. For example, in some implementations, the three-dimensional sensor modules produced using these techniques are operable to project a pattern of light that is more evenly distributed onto a subject (e.g., having fewer misalignments and/or gaps between the cells of the pattern, having localized variations in dot density, etc. compared to a three-dimensional sensor module produced without these techniques). Thus, the three-dimensional sensor modules can detect and measure physical features and/or movements more consistently across its entire field of view. Further, the three-dimensional sensor modules can detect and measure physical features and/or movement according to a greater degree of detail, due to the reduction or elimination of gaps (e.g., blind spots) that might otherwise render a subject's features undetectable to the three-dimensional sensor module.

Figure 4:
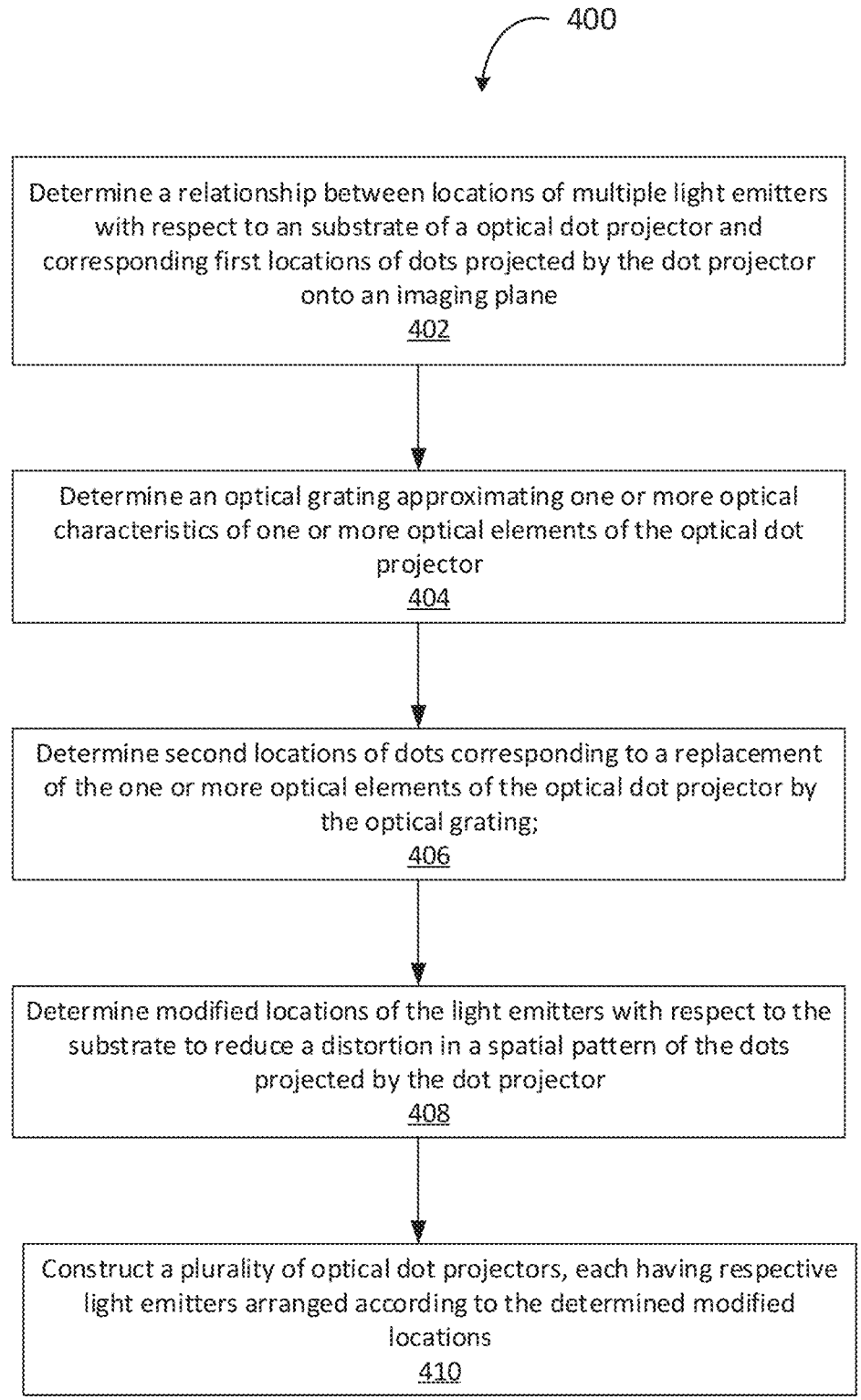
FIG. 4 is a flow chart diagram of an example process for designing and constructing a dot projector.

An example process 400 for designing and constructing a dot projector is shown in FIG. 4. In some implementations, the process 400 can be performed at least in part by one or more computer systems (e.g., as shown in FIG. 8).

In the process 400, for an optical dot projector having multiple light emitters, a relationship is determined between locations of the light emitters with respect to a substrate of the optical dot projector and corresponding first locations of dots projected by the dot projector onto an imaging plane (step 402). For instance, the relationship can define, describe, approximate, or otherwise represent the optical characteristics of one or more of the optical elements of the optical dot projector and their influence on the projection of dots onto the imaging plane. As an example, the relationship can indicate, for each light emitter, the location of that light emitter with respect to a substrate of the optical dot projector (e.g., a planar or substantially planar surface orthogonal to a projection axis of the optical dot projector) and the corresponding location or locations of the projected dot or dots with respect to the imaging plane (e.g., a planar or substantially planar surface orthogonal to a projection axis of the optical dot projector and positioned a particular distance from the optical dot projector).

In some implementations, the relationship can be expressed, at least in part, as a transfer function indicating the first locations of dots projected by the dot projector onto the imaging plane as a function of the locations of the light emitters with respect to the substrate of the optical dot projector. For instance, if the optical dot projector exhibits circular symmetry, the radial position of each dot can be expressed a function of the radial position of the light emitter. As an example, this can be expressed as:

$$R=f(r),$$

where R is the radial positon of a particular dot with respect to the substrate (e.g., the radial distance of the dot from the projection axis), r is the radial positon of a corresponding light emitter with respect to the imaging plane (e.g., the radial distance of the light emitter from the projection axis), and $f(r)$ is the transfer function having r as an input. In a general case, this relationship can be expressed as:

$$(X,Y)=f(x,y),$$

where (X, Y) are the Cartesian coordinates of a particular dot with respect to the substrate (e.g., extending along an x-y plane), (x, y) are the Cartesian coordinates of a corresponding light emitter with respect to the imaging plane (e.g., extending along an x-y plane), and $f(x, y)$ is the transfer function having (x, y) as an input. Note that positions at a given distance z can be converted to a corresponding angle θ using the relationship:

$$\tan(\theta)=r/z.$$

In some implementations, one or more of these relationships can be determined empirically. For instance, an initial "sample" dot projector having a pre-determined arrangement of light emitters can be constructed for testing or calibration purposes. The dot projector can be operated such that it emits a pattern of light onto a test imaging surface (e.g., a planar surface orthogonal to the projection axis of the light projector and positioned at a specified distance from the light projector). The locations of one or more of the projected dots can be measured. Based on these measurements, a transfer function representing the relationship between the locations of the light emitters with respect to the substrate and the locations of the dots with respect to the imaging plane can be determined.

In some implementations, the light emitters can include one of more VSCEL emitters, LEDs, IR LEDs, OLEDs and/or any other type of light emitters arranged on the substrate.

An optical grating approximating one or more optical characteristics of one or more optical elements of the optical dot projector is determined based on the aforementioned relationship (step 404). For example, the dots can be projected onto the imaging plane using the optical dot projector. The locations of the light emitters with respect to the substrate of the optical dot projector can be measured. Further, the first locations of the dots with respect to the imaging plane also can be measured. The relationship can be determined based on the measured locations of the light emitters with respect to the substrate of the optical dot projector and the measured first locations of the dots with respect to the imaging plane.

In some implementations, an "idealized" grating configuration can be determined that approximates the optical behavior of the optical elements of the dot projector. The idealized grating configuration can be, for instance, a notional, theoretical, and/or simplified mathematical representation of a grating configuration. As an example, the idealized grating can be a grating arrangement having a periodic arrangement of equally spaced slits and opaque slits (e.g., a "periodic grating"). Accordingly, determining an optical grating configuration approximating the optical characteristics of the one or more optical elements of the optical dot projector can include determining a periodicity of the optical grating with respect to one or more dimensions (e.g., a periodicity of the optical grating with respect to a horizontal dimension x, and a periodicity of the optical grating with respect to a vertical dimension y orthogonal to the horizontal dimension x).

In some implementations, this optical grating configuration can be determined based on the curvature of a group of dots produced by a single light emitter with respect to one or more dimensions (e.g., horizontal and/or vertical), the number of dots in that group (e.g., the effective number of constructive interference orders of the diffractive optical elements), and the wavelength of light emitted by the light emitter, among other parameters. For instance, the optical grating configuration with respect to a single dimension can be determined using the relationship:

$$\sin\theta = p\frac{\lambda}{\Lambda},$$

where $\theta$ is the angle of a particular dot with respect to the projection axis, p is the diffraction order corresponding to that dot, $\lambda$ is the wavelength of the emitted light, and $\Lambda$ is the distance between gratings in the idealized grating configuration (e.g., the "period" of the gratings).

As an illustrative example, a representative light emitter projects 441 corresponding dots onto the imaging plane, generally corresponding to a pin-cushioned 21×21 grid. Accordingly, in the x-direction, the diffractive light elements of the dot projector exhibits 21 distinct orders (e.g., orders −10, −9, . . . −1, 0, +1, . . . , +10). If the light emitter emits light at a wavelength of 940 nm, and the dot corresponding to the +10$^{th}$ order is positioned at an angle of 15° relative to the projection axis with respect to the x-direction, the above relationship can be written as:

$$\sin 15° = 10\frac{940\text{ nm}}{\Lambda_x}.$$

Accordingly, the period of the idealized optical grating configuration along the x-direction is $\Lambda_x$=36.3 μm. Similarly, in the y-direction, the diffractive light elements of the dot projector also exhibits 21 distinct orders (e.g., orders −10, −9, . . . −1, 0, +1, . . . , +10). If the light emitter emits light at a wavelength of 940 nm, and the dot corresponding to the +10$^{th}$ order is positioned at an angle of 15° relative to the projection axis with respect to the x-direction, the period of the idealized optical grating configuration along the y-direction is $\Lambda_y$=36.3 μm.

Second locations of dots corresponding to a replacement of the one or more optical elements of the optical dot projector by the optical grating are determined (step 406). For instance, the positions of the dots produced by each light emitter is calculated, assuming for the purposes of the calculation that the optical elements of the optical dot projector preceding the diffractive optical elements 106 have been replaced by the aforementioned idealized grating configuration. As an example, these locations can be determined with respect to three-dimensions using the relationship:

$$\frac{2\pi}{\lambda_d}\begin{bmatrix}u_d\\v_d\\w_d\end{bmatrix} = \frac{2\pi}{\lambda_i}\begin{bmatrix}u_i\\v_i\\w_i\end{bmatrix} + p\frac{2\pi}{\Lambda_x}\begin{bmatrix}1\\0\\\#\end{bmatrix} + q\frac{2\pi}{\Lambda_y}\begin{bmatrix}0\\1\\\#\end{bmatrix},$$

where $\Lambda_x$ is the period of the idealized optical grating with respect to x dimension, $\Lambda_y$ is the period of the idealized optical grating with respect to y dimension, (u, v, w) define unit vector coordinates in the (x, y, z) axes, i refers to incident light (e.g., input light), d refers to diffracted light (e.g., output light), and $\lambda_x$ is the wavelength (which can be different when the input and output materials are different, such as materials having different refractive indices). Because we are interested in the directions in air and because we use the formula for a virtual grating, both $\lambda_i$ and $\lambda_d$ can be simplified as $\Lambda$, the wavelength of light in air.

Modified locations of the light emitters with respect to the substrate are determined based on the second locations of dots (step 408). In some implementations, the modified locations can be determined using the transfer function determined with respect to step 402. For instance, the modified locations can be determined by applying the transfer function in reverse (e.g., inverse) to the second locations of dots that were determined with respect to step 406).

Figure 5:
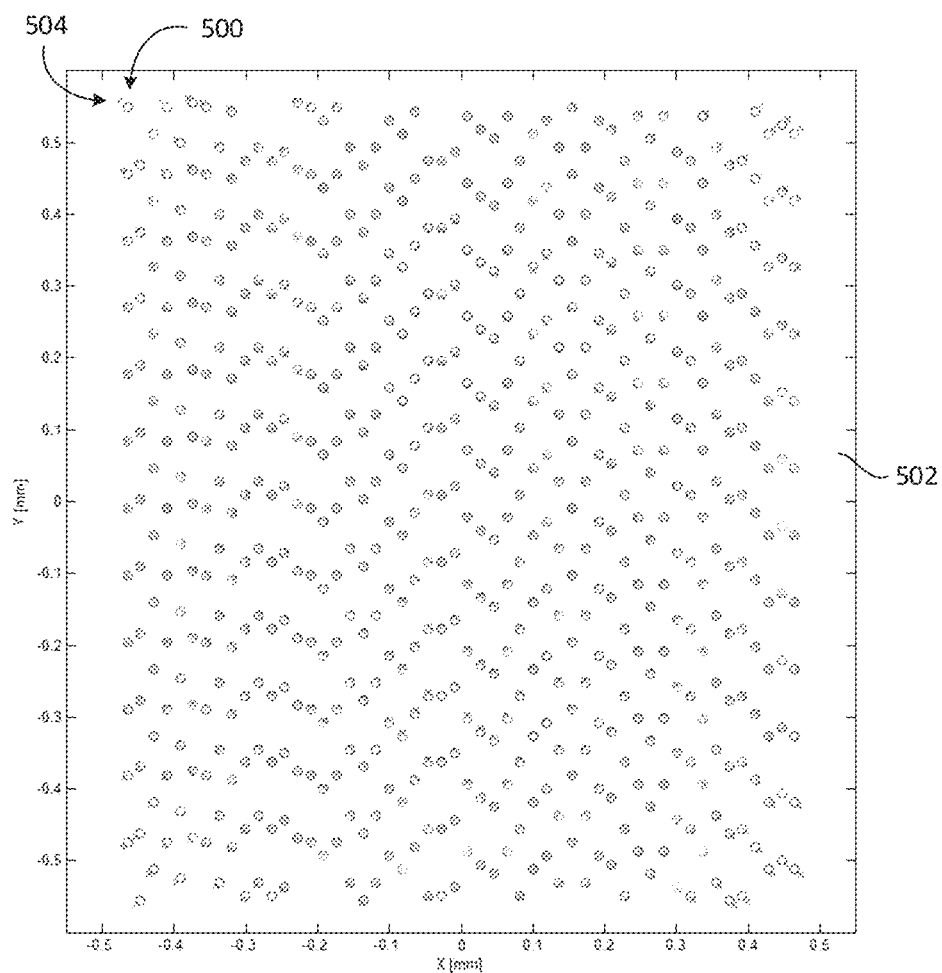
FIG. 5 is a diagram showing the original locations and the modified locations of several example light emitters positioned on a planar substrate of a light source.
Figure 6:
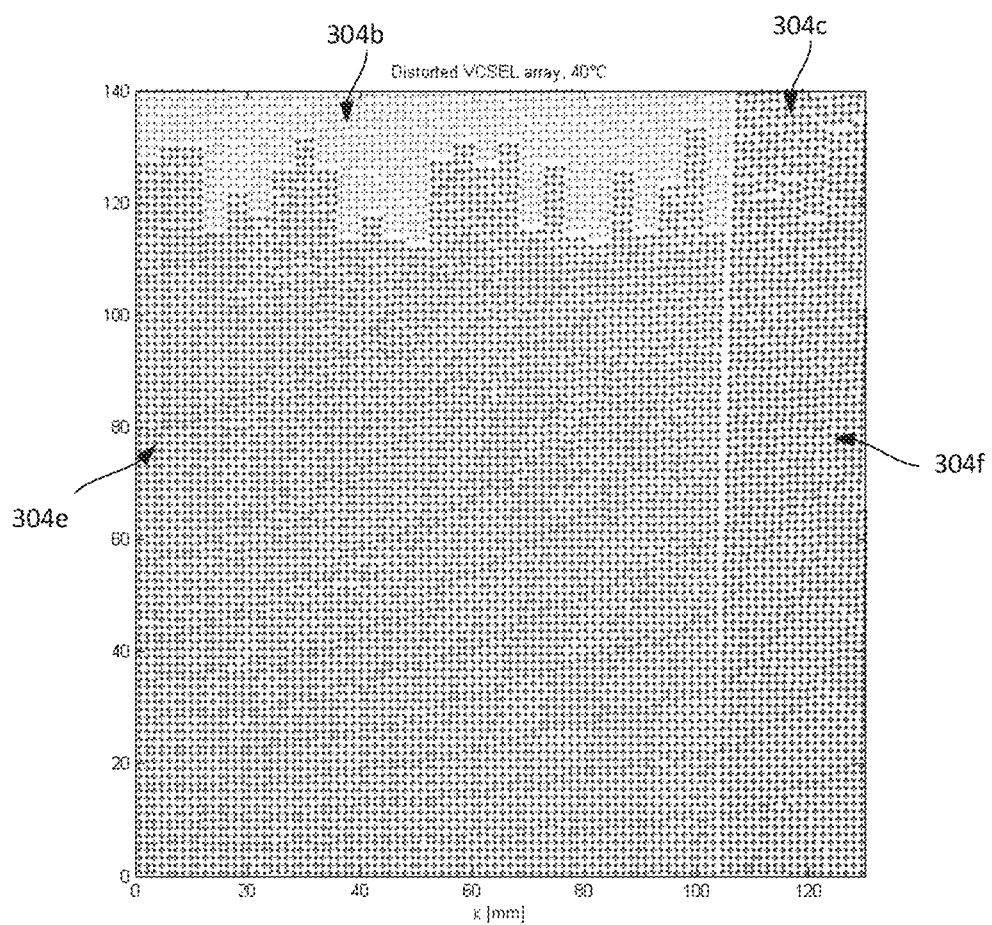
FIG. 6 is a diagram of an example pattern of light projected onto an imaging plane.

These modified locations reduce a distortion in a spatial pattern of the dots projected by the dot projector. As an example, FIG. 5 shows the original locations 500 (indicated using circles) of several representative light emitters positioned on a planar substrate 502, and the modified locations 504 (indicated using crosses) of those light emitters (e.g., determined with respect to step 408). Further, FIG. 6 shows a zoomed in portion of the pattern of light 132 corresponding to the modified locations 504 of light emitters, showing a similar region as in FIG. 3B, Panel B (e.g., the interface between cells 304b, 304c, 304e, and 304f). As shown in FIG. 6, the pattern of light 132 corresponding to the modified locations 504 of light emitters exhibits less pronounced gaps between the cells compared to the pattern of light 132 corresponding to the original locations 500 of light emitters. Further, the pattern of light 132 corresponding to the modified locations 504 of light emitters exhibits a more consistent dot density compared to the pattern of light 132 corresponding to the original locations 500 of light emitters.

Multiple optical dot projectors are constructed, each optical dot projectors having respective light emitters arranged according to the determined modified locations (step 410). As an example, one or more "production" three-dimensional sensor modules can be constructed, each having the modified arrangement of light emitters determined with respect to step 408. This can include producing several light sources 102, each having the modified arrangement of light emitters, and mounting one or more diffractive optical elements 106 in optical communication with each light source 102 (e.g., to form one or more dot projectors 110).

Further, one or more optical sensor modules can be constructed. For example, three-dimensional sensor modules 100 can be constructed by packaging respective optical dot projectors and respective image sensors together (e.g., within a housing or enclosure). In turn, the constructed three-dimensional sensor modules can be installed in electronic devices, such as smart phones, tablets, and other portable computing devices.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the three-dimensional sensor module 100 (e.g., the electronic control device 130) can be implemented using digital electronic circuitry, or in computer software, firmware, or hardware, or in combinations of one or more of them. In another example, the process shown in FIG. 4 can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
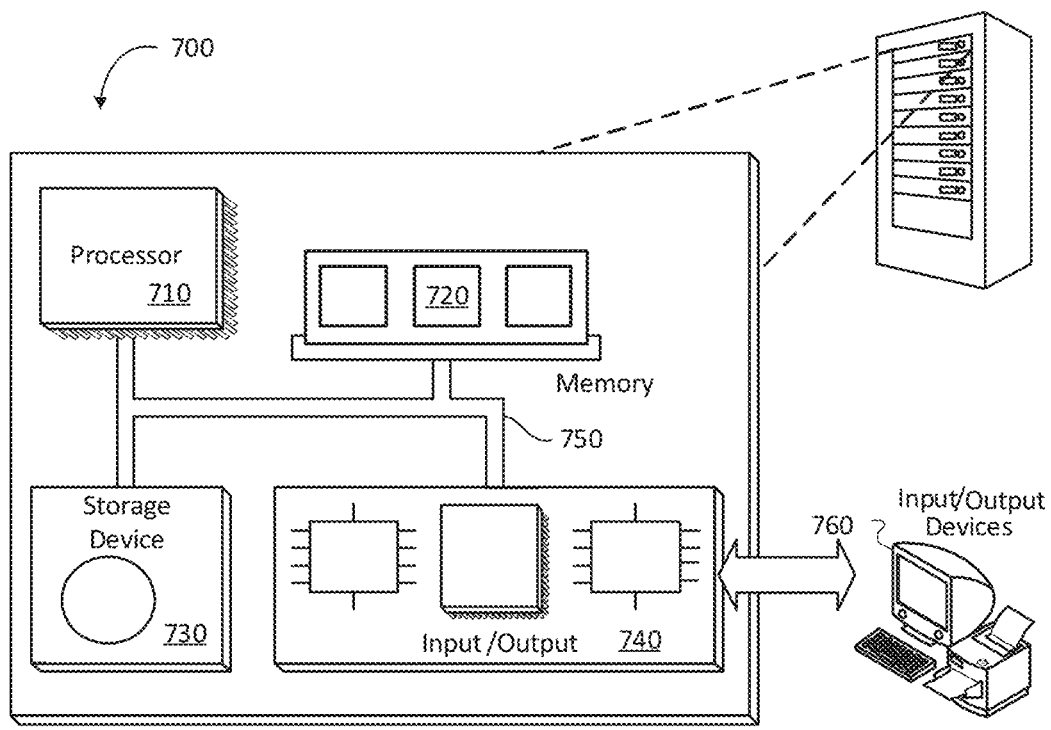
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. In some implementations, the computer system 700 can be used to control the operation, design, and/or construction of a dot projector. For example, the electronic control device 130 shown in FIG. 1 can include a computer system 700 to control the operation of one or more components of a dot projector. As another example, a computer system 700 can be used to perform some or all of the steps described with respect to FIG. 4. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 800. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, various modifications may be made without departing from the spirit and scope of the invention. Accordingly, other implementations are within the scope of the claims.

What is claimed is:

1. A method comprising:
    determining, for an optical dot projector having a plurality of light emitters, a relationship between locations of the plurality of light emitters with respect to a substrate of the optical dot projector and corresponding first locations of dots projected by the dot projector onto an imaging plane;
    determining, based on the relationship, an optical grating approximating one or more optical characteristics of one or more optical elements of the optical dot projector;
    determining second locations of dots corresponding to a replacement of the one or more optical elements of the optical dot projector by the optical grating;
    determining, based on the second locations of dots, modified locations of the plurality of light emitters with respect to the substrate to reduce a distortion in a spatial pattern of the dots projected by the dot projector; and
    constructing a plurality of optical dot projectors, each having a respective plurality of light emitters arranged according to the determined modified locations.

2. The method of claim 1, wherein the relationship comprises a transfer function indicating the first locations of dots projected by the dot projector onto the imaging plane as a function of the locations of the plurality of light emitters with respect to the substrate of the optical dot projector.

3. The method of claim 1, wherein the plurality of light emitters comprises a plurality of vertical cavity surface emitting laser (VSCEL) emitters arranged on the substrate.

4. The method of claim 1, wherein the optical grating is determined based on a curvature of the first locations of dots with respect to a horizontal dimension of the imaging plane.

5. The method of claim 4, wherein the optical grating is further determined based on a curvature of the first locations of dots with respect to a vertical dimension of the imaging plane.

6. The method of claim 1, wherein the one or more optical elements comprises one or more diffractive optical elements.

7. The method of claim 1, wherein determining the optical grating approximating the optical characteristics of the one or more optical elements of the optical dot projector comprises determining a first periodicity of the optical grating with respect to a first dimension.

8. The method of claim 7, wherein determining the optical grating approximating the optical characteristics of the one or more optical elements of the optical dot projector further comprises determining a second periodicity of the optical grating with respect to a second dimension, the second dimension being orthogonal to the first dimension.

9. The method of claim 1, further comprising constructing a plurality of optical sensor modules, wherein constructing the plurality of optical sensor modules comprises, for each optical sensor module, packaging a respective optical dot projector of the plurality of optical dot projects and a respective image sensor in the optical sensor module.

10. The method of claim 1, wherein determining the relationship comprises:
   projecting, using the optical dot project, the dots onto the imaging plane;
   measuring the locations of the plurality of light emitters with respect to the substrate of the optical dot projector;
   measuring the first locations of the dots with respect to the imaging plane; and
   determining the relationship based on the measured locations of the plurality of light emitters with respect to the substrate of the optical dot projector and the measured first locations of the dots with respect to the imaging plane.

* * * * *